(12) United States Patent
Cuttner

(10) Patent No.: US 8,943,021 B2
(45) Date of Patent: Jan. 27, 2015

(54) SYSTEM AND METHOD FOR ASSISTIVE CAPTION, VIDEO DESCRIPTION, AND AUDIO DISTRIBUTION

(75) Inventor: Craig Davis Cuttner, Norwalk, CT (US)

(73) Assignee: Home Box Office, Inc., New York, NY (US)

( * ) Notice: Subject to any disclaimer, the term of this patent is extended or adjusted under 35 U.S.C. 154(b) by 60 days.

(21) Appl. No.: 13/566,115

(22) Filed: Aug. 3, 2012

(65) Prior Publication Data

US 2014/0040189 A1 Feb. 6, 2014

(51) Int. Cl.
*G06F 17/30* (2006.01)

(52) U.S. Cl.
USPC ............ 707/610; 707/E17.005; 707/E17.032

(58) Field of Classification Search
None
See application file for complete search history.

(56) References Cited

U.S. PATENT DOCUMENTS

| | | | | |
|---|---|---|---|---|
| 2005/0070241 A1* | 3/2005 | Northcutt et al. | ............ | 455/265 |
| 2005/0076081 A1* | 4/2005 | Rui et al. | ...................... | 709/204 |
| 2011/0016319 A1* | 1/2011 | Lundberg et al. | ............. | 713/170 |
| 2012/0046947 A1* | 2/2012 | Fleizach | ...................... | 704/260 |
| 2013/0167173 A1* | 6/2013 | Davis et al. | ..................... | 725/37 |

* cited by examiner

*Primary Examiner* — Anteneh Girma

(74) *Attorney, Agent, or Firm* — Eric Sophir; Dentons US LLP

(57) ABSTRACT

Systems and methods are disclosed herein to a computer-implemented method for providing assistive technology, the method comprising receiving, by a computing device, a media file comprising an assistive media component configured to assist a user with viewing or hearing a particular content file being screened at a venue; receiving, by a computing device, an audio portion of the content file using an audio receiving device; determining, by a computing device, a time signature of the audio portion of the content file by performing sound processing on the received audio portion of the content file; synchronizing, by a computing device, the media file with the content file by matching a time synchrony track of the media file with the determined time signature of the content file; and outputting, by a computing device, the assistive media component included in the media file in synchronization with the content file.

23 Claims, 7 Drawing Sheets

SYSTEM AND METHOD FOR ASSISTIVE CAPTION, VIDEO DESCRIPTION, AND AUDIO DISTRIBUTION

TECHNICAL FIELD

The present invention relates generally to assistive technology, and more particularly to systems and methods for providing assistive technology such as assistive captioning and video description.

BACKGROUND

Many people suffer from hearing impairment and vision impairment. Assistive technology, such as Braille, speech recognition software, hearing aids, cochlear implants, and closed captioning, can assist those with hearing or vision impairment, and other technology-based solutions have improved the daily lives of those who have hearing and vision impairment. Assistive technology assists those with disabilities in not only realizing basic necessities, but also in enjoying leisure activities, such as watching television or movies. For example, subtitles or captioning may help those with hearing impairment watch a movie or television show. As another example, audio narration may help those with vision impairments enjoy media productions. Other attempts, including enhanced audio, smart glasses, and other assistive technologies have been suggested to assist those with hearing or vision impairment enjoy audio and video content.

Installing assistive technology devices in a venue, such as a movie theater, helps those with disabilities enjoy leisure activities, such as watching a movie in the movie theater. Adding the assistive technology to a venue, however, may come at a great cost to a company or person that runs the venue. The high investment cost required to install assistive technology in a venue may discourage venue owners from using the assistive technology in their venue. Without assistive technology, patrons with hearing or vision impairment may not be able to enjoy the leisure activities in the venue. The patrons with hearing or vision impairment may be frustrated by the lack of accommodation, and the venue may lose revenue by excluding those with hearing or vision impairment.

In an example of a conventional movie theater, FIG. 1 illustrates the high cost and complexity required to include assistive technology in a conventional movie theater. A movie theater 100 includes a projector 110, a screen 114, speakers 112, caption devices 140, an audio receiver 145, wiring 150, and a wireless antenna 126. The projector 110 displays content provided from a content server 120 on the screen 114. The audio sound track of the content is emitted through the speakers 112.

Theater goers without disabilities are able to enjoy the content by watching the screen 114 and hearing the audio sound track through the speakers 112. However, members of the audience with disabilities may need assistive technology to enjoy the content. The members of the audience with hearing impairment may use the caption devices 140, which may be included on a back of a seat or mounted on a bar in front of a seat in the theater 100, to see subtitles for the words spoken on the screen 114. The members of the audience with vision impairment may use individual audio equipment 145, which may include wired or wireless headphones, to hear an audio narration of the events happening on the screen 114.

In order to provide captions and audio narration to the caption devices 140 and the individual audio equipment 145, an assistive technology server 125 transmits the captioning and audio narration data through the wireless antenna 126 and/or the wiring 150. The assistive technology server 125 synchronizes with the content server 120 so that the captions and audio narration matches the content shown on the screen 114.

As shown in FIG. 1, an additional server and a plurality of additional equipment is included in the theater 100 to provide assistive technology. Also, because a theater cannot anticipate the amount of demand for the assistive technology, the venue may need to provide caption devices 140 and individual audio equipment 145 for each seat in the theater 100. Also, the more wired devices included in the theater 100, the more wiring 150 must be included in the theater 100. Other hidden costs may be included, such as the cost to compose specialized captioning tracks formatted for the theater's equipment. The wiring and equipment can be very expensive, especially if the venue has multiple screens and large theaters.

Thus, a method for a venue to provide assistive technology at a lower cost is desired. The method of providing assistive technology should also be easily applied to any venue, even including a home. Preferably, the method should require minimal installation cost and time.

SUMMARY

The systems and methods described herein attempt to overcome the drawbacks discussed above by providing a method to use portable computing devices, such as tablets, smart phones, and laptops, to provide assistive technology to consumers. By using commonly available client devices, an investment cost for venues can be minimized when providing assistive technology options to its patrons.

In one embodiment, a computer-implemented method for providing assistive technology comprises receiving, by a computing device, a media file comprising an assistive media component configured to assist a user with viewing or hearing a particular content file being screened at a venue; receiving, by a computing device, an audio portion of the content file using an audio receiving device; determining, by a computing device, a time signature of the audio portion of the content file by performing sound processing on the received audio portion of the content file; synchronizing, by a computing device, the media file with the content file by matching a time synchrony track of the media file with the determined time signature of the content file; and outputting, by a computing device, the assistive media component included in the media file in synchronization with the content file.

In another embodiment, a computer-implemented method for providing assistive technology comprises receiving, by a personal device, a media file comprising an assistive media component configured to assist a user with viewing or hearing a particular content file being screened at a venue; reading, by a content reading device, a time stamp from a digital time code included in metadata of the content file; transmitting, by the content reading device, the time stamp to the personal device; synchronizing, by the personal device, the media file with the content file by matching a time synchrony track of the media file with the received time signature from the content reading device; and outputting, by the personal device, the assistive media component included in the media file in synchronization with the content file.

In another embodiment, an assistive technology system comprises a host computer implementing a computer readable program code configured to receive a media file comprising an assistive media component configured to assist a user with viewing or hearing a particular content file being screened at a venue; receive an audio portion of the content file; determine a time signature of the audio portion of the content file by performing sound processing on the received audio portion of the content file; synchronize the media file with the content file by matching a time synchrony track of the media file with the determined time signature of the content file; and transmit the assistive media component of the media file to a client device over a network.

In another embodiment, an assistive technology system comprises a portable device implementing a computer readable program code configured to receive a media file comprising an assistive media component configured to assist a user with viewing or hearing a particular content file being screened at a venue; receive an audio portion of the content file through an audio receiving device; determine a time signature of the audio portion of the content file by performing the sound processing on the received audio portion of the content file; synchronize the media file with the content file by matching a time synchrony track of the media file with the determined time signature of the content file; and output the assistive media component included in the media file in synchronization with the content file.

Additional features and advantages of an embodiment will be set forth in the description which follows, and in part will be apparent from the description. The objectives and other advantages of the invention will be realized and attained by the structure particularly pointed out in the exemplary embodiments in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification and illustrate an embodiment of the invention and together with the specification, explain the invention.

DETAILED DESCRIPTION

Reference will now be made in detail to the preferred embodiments, examples of which are illustrated in the accompanying drawings.

Figure 1:
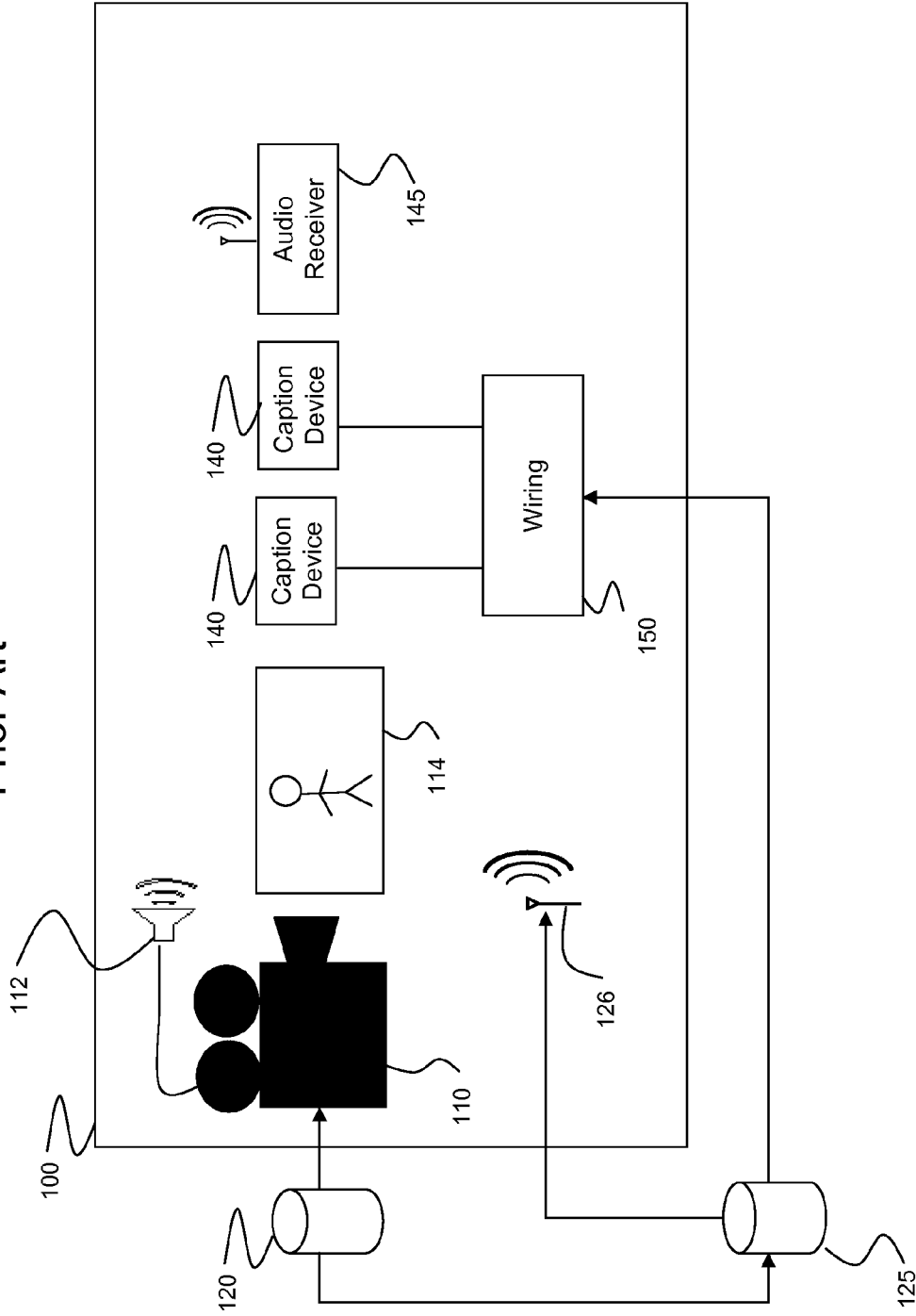
FIG. 1 illustrates a conventional movie theater that includes assistive technology.
Figure 2:
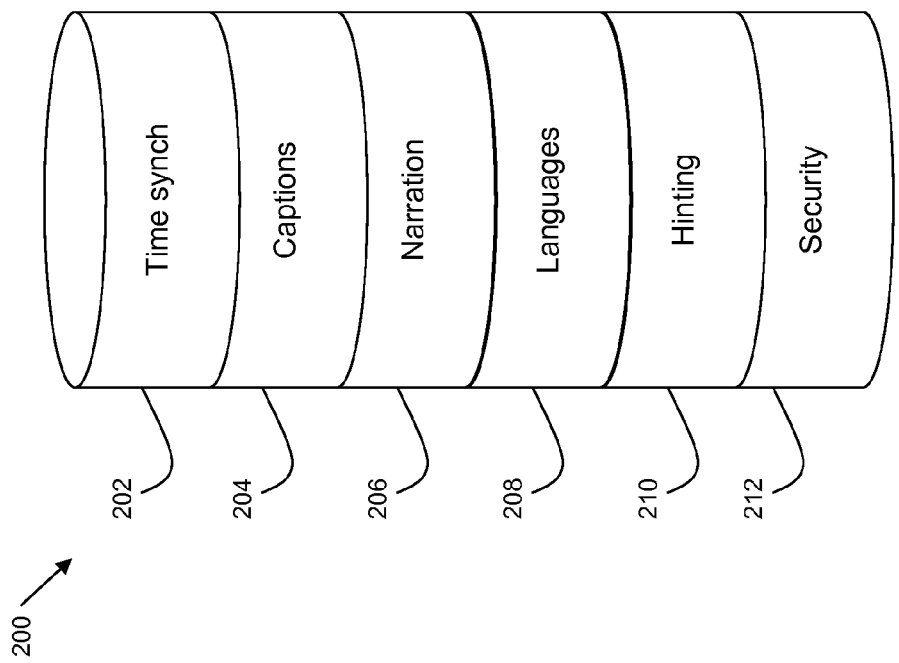
FIG. 2 illustrates layers and components comprising a media file for the assistive technology method of the exemplary embodiments according to an exemplary embodiment.

Turning now to the drawings, in which like numerals represent like (but not necessarily identical) elements throughout the figures, exemplary embodiments of the present invention are described in detail. According to an exemplary embodiment, FIG. 2 illustrates the layers and components comprising an assistive technology media file 200 configured to assist a user with viewing or hearing a particular content file being screened at a venue. The media file 200 contains a number of different layers of additional content that are associated with the particular piece of content. The media file 200 is intended to be played synchronously with the content file. This process will be described in greater detail with respect to the media file and the exemplary embodiments. The media file 200 includes an assistive media component, which may be one or more layers, data, or other information that provides the assistive technology capability, such as closed captioning, video description or narrative, enhanced audio features, and alternate language tracks. The assistive media component of the media file 200 may include a caption track 204, a video description track 206, and one or more alternate language tracks 208. The media file 200 may also include a time synchrony track 202, an audio hinting track 210, and security files 212. The tracks of the media file 200 are associated with a particular piece of content, such as a movie, television show, concert, play, opera, or other recorded or live audio and/or visual content.

The time synchrony track 202 is a file that a computing device, such as a server, a group of servers and databases, a workstation, a personal computer, a tablet, a smart phone, or the like, uses to synchronize the assistive technology content included in the media file 200 with the audio of a content file, such as a movie, television show, piece of music, sporting event, opera, play or any other piece of content, being played in, for example, a theater, a home, a home theater, a concert hall, an auditorium, an outdoor theater, a conference, or the like. A number of methods may be used to synchronize the media file 200 with the content file, some of which are discussed below. However, any method used to synchronize the media file 200 with the content file may be included in the scope of the exemplary embodiments.

In a first synchronization method, a watermarking method, such as Nielsen Audio Video Encoder (NAVE), may be used to determine an exact frame of the content currently being played. Sub-acoustic sounds called watermarks can be embedded into an audio track of a piece of content, and the watermarks are able to provide a time stamp on a periodic basis, e.g., every 0.01 seconds. A system can decode the time stamp from the watermark and match the time stamp with a time stamp in the time synchrony track 202 of the media file 200 to synchronize the media file 200 and the content. While this method may be very accurate and require relatively simple processing, some pieces of content do not include watermarks that contain a time stamp for the content. For example, television programming may include a time stamp. However, watermarks for movies are often used for anti-piracy reasons, but time stamps are not present in the watermarks of a movie. Thus, the watermarking method may not be an adequate solution for all types of content.

In a second synchronization method, a time code, such as a Society of Motion Picture and Television Engineers (SMPTE) time code, may be used to synchronize the media file 200 to the content file. The time synchrony track 202 can include the SMPTE time codes for the content to synchronize the media file 200. The SMPTE time code is an electronic signal that is used to identify a precise playback location within a piece of time-based media like an audio or video track. The SMPTE includes information stating an hour, a minute, a second, and a frame number in an 80 bit binary code to describe the playback location of the content. SMPTE time codes may be embedded onto an audio track of the content, but may suffer from limitations when performing video editing. As a result, a vertical interval time code (VITC) was developed. The VITC is recorded into a blank interval of the video track in between consecutive frames of video. Since recently developed content often uses VITC, SMPTE synchronization may not be an adequate solution because many devices, like tablets or smart phones, may lack the ability to receive the SMPTE code. While this method may be very accurate and require relatively simple processing, it may not be suitable for all situations.

In a third method, audio fingerprinting may be used to synchronize the media file 200 to the content file. Fingerprinting is a condensed digital summary of an audio signal that can be used to identify an audio sample. Audio fingerprinting receives a passage of audio to generate a uniqueness algorithm, which is the condensed digital summary. The uniqueness algorithm accounts for perceptual changes, which are audio changes that the human ear would notice. The types of perceptual changes a robust fingerprint may measure include average zero crossing rate, estimated tempo, average spectrum, spectral flatness, and bandwidth, among other factors. Once the fingerprint summary or uniqueness algorithm is calculated, a system may compare the fingerprint with previously generated fingerprints included in the synchrony track 202 of the media file 200. Once a fingerprint match is found, the media file 200 and the content file may be synchronized.

The fingerprinting method may be preferable in some situations. Any content that has sound typically has a fingerprint, so television shows, concerts, plays, and movies may all have fingerprints without embedding any additional information into the audio signal. Also, to perform fingerprinting, a portable computing device needs only an audio receiving device, such as a microphone, and a processor capable of performing the sound processing and matching analysis. Performing sophisticated sound processing like fingerprinting down to a very fine level, such as within a second or an exact frame, may require more processing power. Portable computing devices, such as tablets and smart phones, may lack the necessary processing power to perform such fine sound processing. If fingerprinting can be used, the time synchrony track 202 may be pre-indexed with the fingerprints of the content file, and the media file 200 and the content file may be synchronized by comparing the pre-indexed fingerprints with the fingerprints generated by receiving and analyzing to the audio track of the content file.

Referring again to FIG. 2, the caption track 204 includes the subtitles for the content file associated with the media file 200. The subtitles may be presented in any format, such as SMPTE 428-7, SMPTE 2052-1, AQTitle, MPSub, Gloss Subtitle, VobSub, Imitext, Cinema, D-Cinema, or any other captioning format. Because subtitles of the captions track 204 are time sensitive, the captions are displayed on a client device once the media file 200 and the content file are synchronized using the time synchrony track 202. The subtitles included in the captions track 204 may include alternative languages subtitles. Those with hearing impairment or those who do not natively speak the language of the content file, may use the caption track 202 to enjoy the content file.

The video description track 206 includes an audio narration of the content file associated with the media file 200. The narration may be used by those with vision impairment to understand the actions shown on the screen, which they cannot properly see. Again, the narration of the video description track 206 may be in alternative languages. The video description track may be played on a client device through headphones or a speaker. Because the audio narration track 206 is also time sensitive, the audio narration track 206 is played on a client device upon the synchronization of the media file 200 and the content file using the time synchrony track 202.

The alternative languages track 208 includes the dialogue of the content file in alternative languages. The number of language included in the alternative language track 208 may depend on the location of the venue or the distributor of the media file 200. Once the media file 200 is synchronized with the content file, an alternative language may be dubbed over the dialogue of the content file by utilizing the alternative language track 208 on a client device. Because the alternative languages track 208 is also time sensitive, the alternative languages track 208 is played on a client device upon the synchronization of the media file 200 and the content file using the time synchrony track 202

The hinting track 210 may assist client devices, such as a laptop, a smart phone, a tablet, or any other personal computing device, with the sophisticated sound processing necessary for the fingerprinting method. Hinting may be a process that analyzes data in a larger block than in the fingerprinting method, such as a 10 or 20 second block, to locate a unique sound within the block. The unique sound may be an explosion, a cymbal crash, a character sneezing, or some other loud, recognizable, or unique sound within the content file. The hinting track 210 may provide coarse fingerprinting to give an estimated playback location of the content file. Once the estimated playback location of the content file is established, the system may perform fingerprinting to more finely determine the playback location of the content file. The hinting process requires less sound processing, and thereby, less processor power and capability. As a result, the hinting process may also conserve battery life for client devices. The hinting track 210 may also be pre-indexed into blocks to identify the unique sounds. The hinting track 210 may be accessed before the time synchrony track 202. Also, the hinting track 210 may be omitted or ignored if a device with capable processing power is performing the fingerprinting.

The security file 212 includes digital rights management systems to protect the content file provider from any copyright infringement. The video description or script of the movie shown through captions may have value to the content providers. As a result, the content providers may use this security file 212 to limit the use for the media file 200 in an attempt to prevent copyright infringement. For example, if the content file is a movie shown in a theater, the security file 212 may limit the number of times the media file can be opened or the number of times a window in which the media file resides can be opened. The media file 200 may be treated like a rental file, a file that only be accessed for 24 hours, or some other limited timeframe. Alternatively, the media file 200 may be associated with a movie theater show time. In this example, access to the media file 200 may be granted only by entering a code listed on a movie ticket. The media file 200 may only be accessed after the movie has started and before the movie ends. In another security embodiment, the media file 200 may only be accessed if it receives a security beacon from the theater. In this embodiment, the theater sends out a wireless signal, which may be called a beacon, that prevents any access to the media file 200 unless a client device is constantly receiving the beacon. The beacon may be limited in range or other cryptographic localization techniques so that only those sitting in the venue have access to the media file 200. This process will be described in greater detail with reference to FIG. 6. For home theater use, the media file 200 may be included with special copies of a Blu-ray, DVD, or digital download. The media file included in the Blu-ray, DVD, or digital download may have a code associated with the particular Blu-ray, DVD, or digital download or may contain an audio-type watermark that enables the media playback similar to the "beacon" in the theater venue. The media file 200 included in the Blu-ray, DVD, or digital download may limit the number of client devices that can download the media file 200 using that particular code. The security file 212 may have a plurality of other protection devices to ensure that only bona fide customers receive the media file 200.

Exemplary methods using the media file 200 are described below with reference to FIGS. 3-6. These figures illustrate methods of providing assistive technology and alternative languages to client devices using the media file 200. All methods described below use the media file 200 to provide the assistive technology for a particular piece of content.

Figure 3:
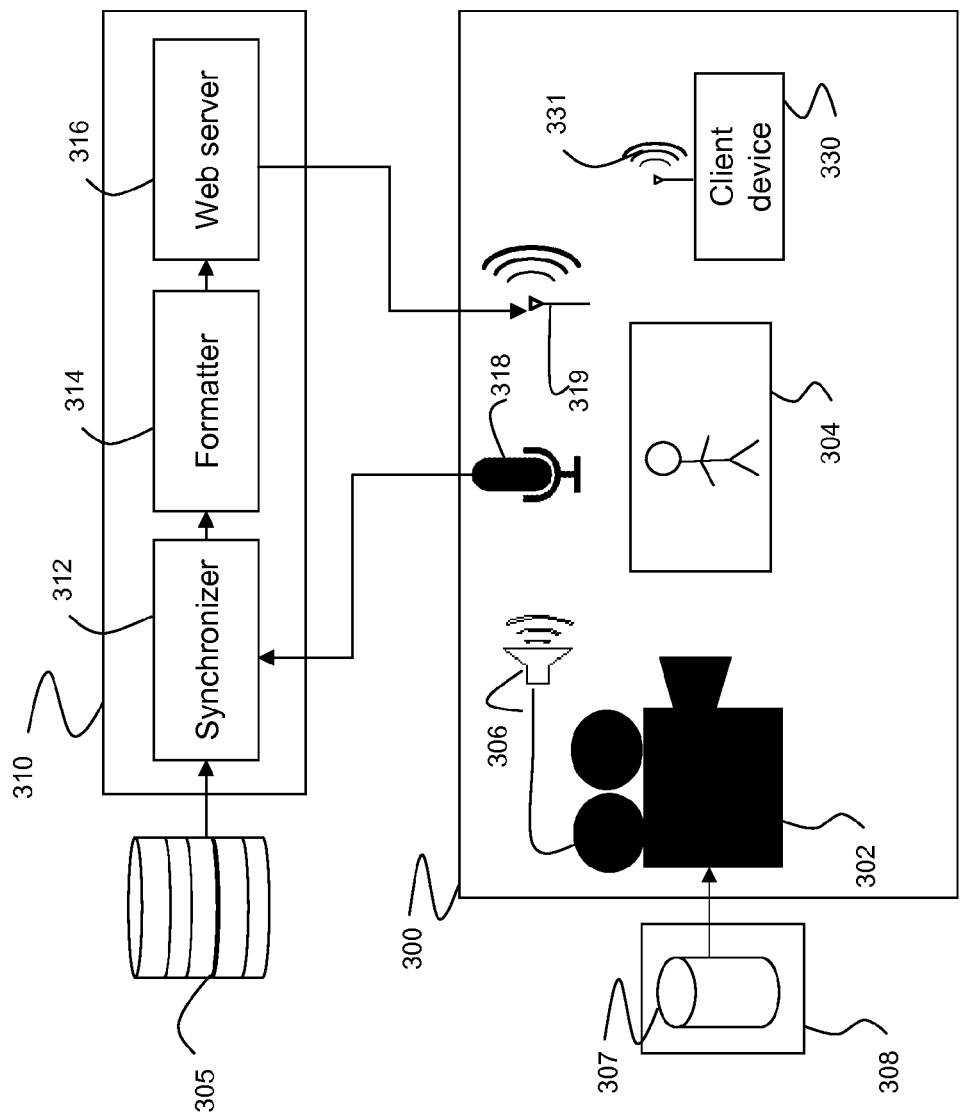
FIG. 3 illustrates a server based method of providing assistive technology according to an exemplary embodiment.

FIG. 3 illustrates a server-based method of providing assistive technology according to the exemplary embodiments. A movie theater 300 includes a projector 302, a screen 304, and speakers 306. A movie theater 300 is illustrated in this exemplary embodiment, but the exemplary method can easily be adapted to a home theater, an outdoor theater, or any other type of facility that presents content. The projector 302, such as a 3-D projector, an IMAX® projector, a film projector, a digital projector, or any other device capable of displaying media content, displays content 307 provided from a content server 308 on the screen 304. The audio sound track of the content 307 is emitted through the speakers 306.

An integrated server 310 can be remotely located from the theater 300. The integrated server 310 may include one or more servers and databases that receive information over a network such as the internet, store the received information, and output assistive technology for the media content in the theater 300. The integrated server 310 includes a synchronizer 312, a formatter 314, and a web-server 316. The synchronizer 312, the formatter 314, and the web-server 316 can be a tangible computer-readable medium having computer-readable program code having modules that can be executed by a processor. The integrated server 310 may be connected to a microphone 318 and an antenna 319, both of which are located within the theater 300. The integrated server 310 receives or stores the media file. The microphone 318 receives the audio sound track of the content 307 emitted from the speakers 306. The microphone 318 sends the received audio sound track of the content file 307 to the synchronizer 312 in the integrated server 310.

The synchronizer 312 receives the synchrony track of the media file and the audio sound track of the content file 307 and synchronizes the media file with the content file 307, such as by using watermarking, SMPTE time codes, or fingerprinting. If the synchronizer 312 is a component of the integrated server 310, the hinting track may be omitted because the integrated server 310 may have sufficient processing power to perform fine fingerprinting of the entire content file 307. In another embodiment, the integrated server 310 may be connected to the content server 308. In this embodiment, the microphone 318 may be unnecessary, as the integrated server 310 is configured to receive SMPTE time codes directly from the content server 308. The synchronizer 312 may determine the time stamp of the content file 307 and begin playback of the media file from the determined time stamp of the content file 307 to play in synchronization with the content file 307. The synchronizer 312 may also perform periodic updates to check if the media file and the content file 307 remain in synchronization throughout the playback of the content file 307.

The formatter 314 receives the synchronized media file from the synchronizer 312 and formats tracks of the media file for distribution to a client device 330. The formatter 314 is configured to format the data included in the media file for all types of client devices 330. For example, the formatter may format the data to be displayed on tablets differently than the data to be displayed on smart phones. The formatted data is sent to the web server 316.

The web server 316 receives the formatted and synchronized media file and transmits the media file to the client devices 330 through an antenna 319. The wireless antenna 319 may provide the captions, video descriptions, and other data of the media file through a wireless network. The wireless antenna 319 may use WiFi, Bluetooth, infrared, or any other type of radio frequency techniques. The wireless antenna 319 may provide formatted data of the media file to the entire theater venue, or each theater in a multi-theater venue may have its own wireless antenna 319. The web-server 316 may also be configured to manage a website. In such a configuration, the client device 330 is able to receive the assistive technology via a web-page.

The client devices 330 may receive the captions, video descriptions, and other data from the web server 316 through a web browser or a specialized software application. Once the web browser or software application receives information from the web server 316, the client device 330 can display captions, output the audio narration, or output alternative languages.

In the server based method of FIG. 3, a server performs the sound processing required to synchronize the media file and the content file 307. While the integrated server 310 is suited to perform high level processing, such as fine fingerprinting, the venue may still be required to install the integrated server 310. An existing server, such as the content server 308, may be capable of performing the synchronization and web serving processes as well as providing the content 307 to the projector 302.

Further, the client device 330 does not need to download the media file on the client device 330. For example, the client device 330 can obtain the media file through streaming and/or via a web-page. As a result, a patron desiring to utilize the captions, video descriptions, or alternative languages of the media file 305 need only bring a client device, such as a tablet or smart phone, to the theater 300. No additional set up or downloading may be required, unless a software application must first be downloaded. However, applications are often much smaller in size than media files, so the application may be downloaded through an application distribution store. In this embodiment, the amount of preparation on the client end can be minimized.

Figure 4:
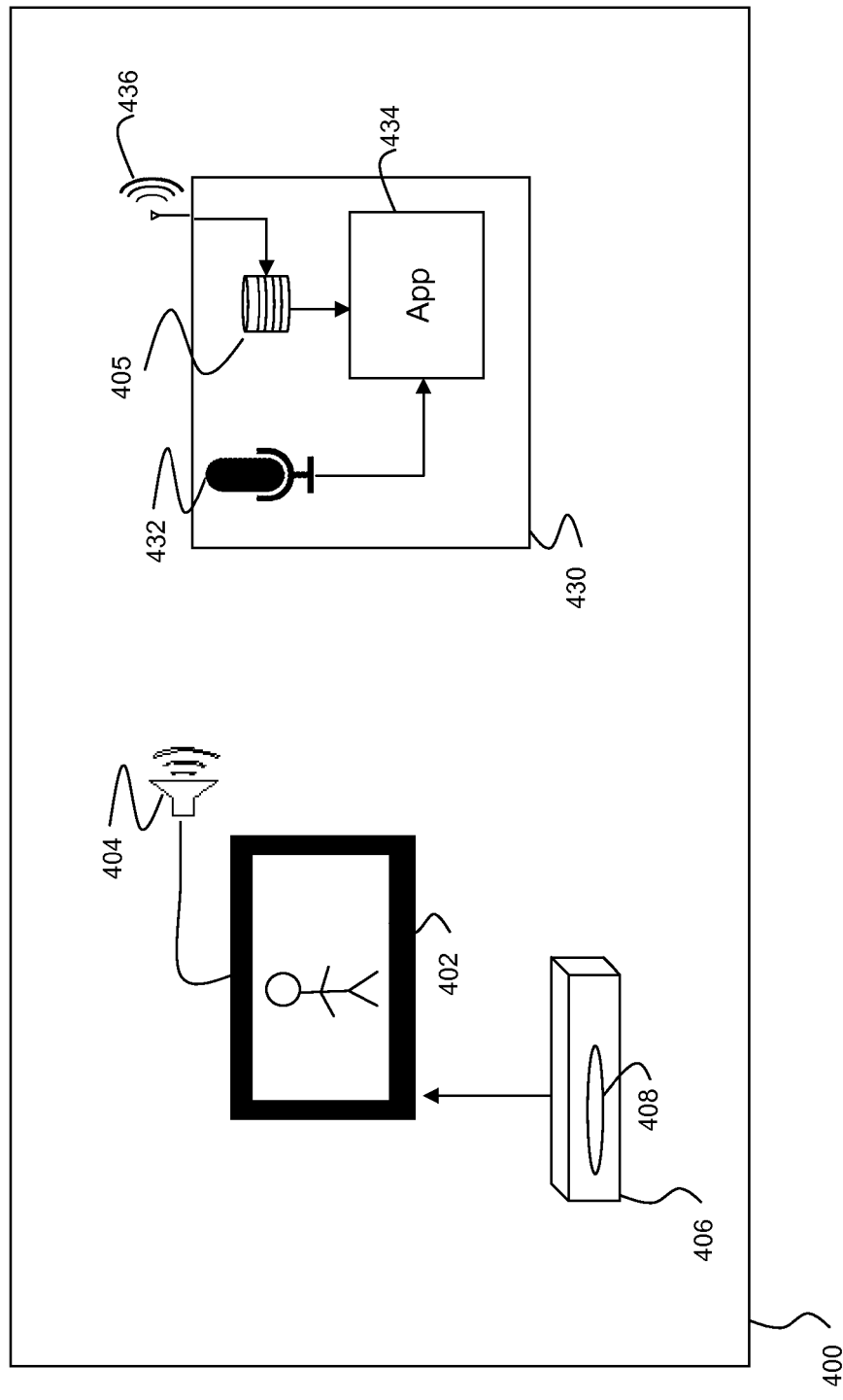
FIG. 4 illustrates an autonomous client based method of providing assistive technology according to an exemplary embodiment.

FIG. 4 illustrates an autonomous client based method of providing assistive technology according to an exemplary embodiment. A home theater 400 includes a television 402, television speakers 404, a Blu-ray player 406, and a content file 408. The Blu-ray player 406 reads the content file 408 and sends the audio and video data to the television 402. The television 402 displays the video portion of a content file 408, and the television speakers 404 emit the audio portion of the content file 408. A home theater 400 is illustrated in this exemplary embodiment, but the exemplary method of FIG. 4 can easily be adapted to a movie theater, an outdoor theater, or any other type of facility that presents content. In addition, a television 402 and a Blu-ray player 406 are illustrated as exemplary equipment included in a home theater, and the home theater may include additional or alternative display devices or content reading devices. For example, the home theater 400 may include a computer, a projector connected to a DVD player, a television connected to a gaming console, or any other combination of equipment that presents content for viewers. Also, the content file 408 in this exemplary embodiment is shown to be a Blu-ray disc, but the content file 408 may be any digital content format, such as a DVD, a cable signal, or a digital download.

In addition, a personal device 430 allows a user watching the content file 408 in the home theater 400 to use assistive technology. The personal device 430 may be the same devices as the client device 330 of FIG. 3. The personal device 430 includes a microphone 432, a software application 434, a wireless antenna 436, and the media file.

The microphone 432 is configured to receive the audio sound track of the content file 408 emitted by the television speakers 404. The received audio sound track is transferred to the software application 434. The software application 434 also receives the media file 405, which may have been previously downloaded via the wireless antenna 436. The software application 434 may be implemented as a software package, a smart phone application, a firmware update, an operating system update, or any other method of updating the device to include the processes and routines of the software application 434. In the method of FIG. 4, the media file 405 is downloaded using the wireless antenna 436, but the media file may have been distributed in different ways, such as being included on the Blu-ray disc 408, a CD-ROM, a USB drive, or being transferred from a computer.

The application 434 receives the media file 405 and the audio sound track received by the microphone 432 and synchronizes the media file with the content file 408 using watermarking, SMPTE time codes, or fingerprinting. If the application 434 synchronizes the media file with the content file 408, the software application 434 may use the hinting track to perform coarse fingerprinting before performing fine fingerprinting using the time synchrony track. The software application 434 may first perform coarse fingerprinting because the personal device 430 may not have the same processing power as an integrated server. If the personal device 430 has sufficient processing power, the hinting track may be ignored by the software application 434. The software application 434 may be configured to determine the specifications of the processor of the personal device 430 and the demand on the processor of the device 430 before deciding to use the hinting track 410. However, if watermarking time stamps or SMPTE time codes are available to the personal device 430, the personal device 430 uses watermark time stamps or SMPTE time codes to synchronize the media file to the content file 408.

Once the media file 405 is synchronized with the content file 408, the application 434 displays the subtitles, outputs the video description audio, or outputs the alternative languages. The subtitles of the caption file 204 may be displayed on the screen of the personal device 430, and the audio of the video description or the alternative languages may be output through headphones or a speaker coupled to the personal device 430.

Additional equipment may be added on to the personal device 430, such as a Braille display or enhanced audio equipment. The software application 434 may detect this additional equipment and update the manner that the captions, video description, or alternative languages are delivered to a user of the personal device 430. The assistive technology may be delivered by different methods by optionally changing a settings function in the application 434.

Additionally, in another embodiment, the personal device 430 may utilize the wireless antenna 436 to receive time stamps from the Blu-ray player 406 when the Blu-ray player 406 can connect to other devices wirelessly and provide time stamps. In this embodiment, no sound processing is required by the application 434 to synchronize the media file 405 to the content file 408, and the application 434 may match the time stamp received from the Blu-ray player 406 with a corresponding time stamp in the media file 405.

In the autonomous client based method of FIG. 4, the theater 400 includes no additional equipment. For example, if the theater 400 is a movie theater, a patron brings his/her own personal device 430 to the movie theater to receive the assistive captions and/or video descriptions. In many instances, the personal device 430 is a piece of technology that the patron is already carrying, especially if the device personal 430 is a smart phone. As shown, no additional equipment is installed in the theater 400 or outside of the theater 400 because the personal device 430 performs the method autonomously. Thus, the embodiment of FIG. 4 can provide theater venues with a method of provide assistive technology at a lower cost to the theater venue.

While the costs of to provide the autonomous client based method are minimized, the personal device 430 may be required to do the majority of the sound processing. While some devices are likely capable of handling fingerprinting, the hinting track may provide lighter processing for devices. The hinting track may provide a general area of the playback location of the content file 408. Once the hinting track has provided a general area of search, the personal device 430 performs fingerprinting synchronization using the time synchrony track within the general area determined by the hinting track. If only a block of audio is to be fingerprinted, the processor performs less sound processing. After synchronization of the media file 405 with the content file 408, the software application 434 may perform periodic updates to confirm that the media file 405 is still synchronized with the content file 408. The amount of periodic updates may depend on the personal device 430, a battery life of the device, and processing power of the device. A user may also be able to prompt the personal device 430 to re-synchronize if de-synchronization is noticeable.

The personal device 430 may utilize an installed software application. However, as discussed above, software applications for laptops, tablets, and smart phones may be downloaded and installed. Software applications are readily available at application distribution stores, which can be remotely accessed on the go, and the set-up time for downloading and installing software applications on mobile devices may be just a few minutes, depending on the speed of a network and a processor included in the mobile device. However, in the exemplary embodiment, the personal device 430 downloads the media file 405. The media file 405 may take additional time to download, but given the speed of most 3G, LTE, WiFi, and other networks, the time to download the media file 405 should not be overly burdensome. Also, the audio on the media file may be encoded to compress the size of the audio file of the video description and alternative languages. In addition, a patron may be able to download the media file 405 before even arriving at the theater 400. Optionally, the media file 405 may be broken up into smaller media files, such as a media file that only includes captions, only includes video description, or only includes one alternative language. Such a segmented media file may be much smaller in size to download.

Figure 5:
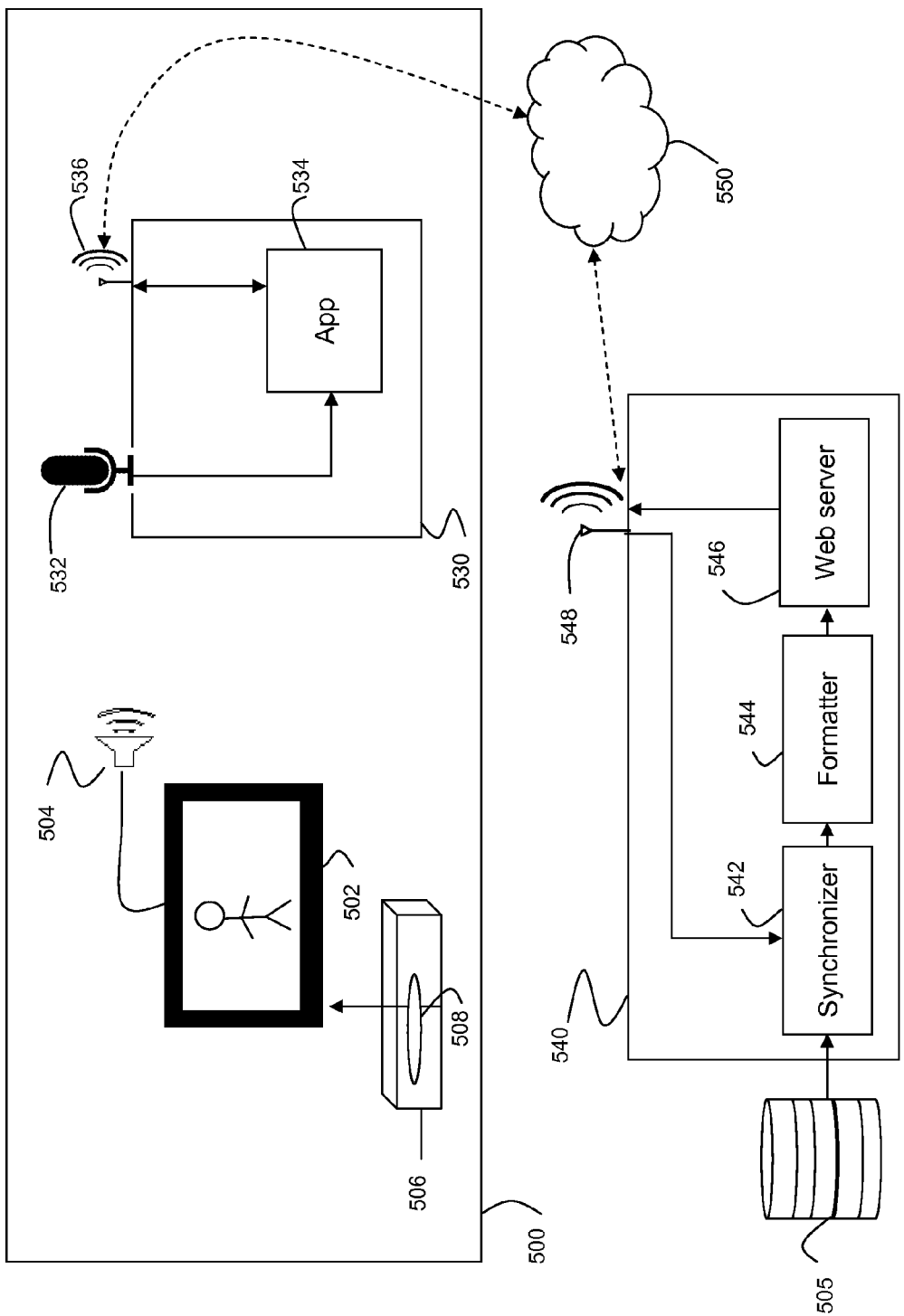
FIG. 5 illustrates a wide area server based embodiment of providing assistive technology according to an exemplary embodiment.

FIG. 5 illustrates a wide area server based embodiment of providing assistive technology according to the exemplary embodiments. A home theater 500 includes a television 502, television speakers 504, a Blu-ray player 506, and a content file 508. The Blu-ray player 506 reads the content file 508 and sends the audio and video data to the television 502. The television 502 displays the video portion of a content file 508, and the television speakers 504 emit the audio portion of the content file 508. A home theater 500 is illustrated in the exemplary embodiment, but the method can easily be adapted to a movie theater, an outdoor theater, or any other type of facility that presents content. In addition, a television 502 and a Blu-ray player 506 are illustrated as an exemplary equipment included in a home theater, and the home theater 500 may include any other display device or content reading device. For example, the home theater may include a desktop or laptop computer, or a projector connected to a DVD player, a television connected to a gaming console, or any other combination of equipment that presents content for viewers. Also, the content file 508 in this embodiment is shown to be a Blu-ray disc. However, the content file 508 may be any digital content format, such as a DVD or a digital download.

In addition, a client device 530 is provided by a user viewing the content file 508 in the home theater 500. The client device 530 may be used to output or display the assistive technology in the media file 505 associated with the content file 508. The client device 530 includes a microphone 532, a software application 534, and a wireless antenna 536.

The microphone 532 is configured to receive the audio sound track of the content file 508 emitted by the television speakers 504. The received audio sound track is transferred to the software application 534. The application 534 receives the audio sound track received by the microphone 532 and sends the received audio sound track to an integrated server 540 through a network 550. The network 550 may be the Internet, or the network may be another local area network (LAN) or wide area network (WAN). Also, the network 550 may be a wired or wireless network, or a combination of both. The integrated server 540 may be remotely located or proximally located to the theater 500. In a preferred embodiment, the integrated server 540 may be remotely located and capable of performing sound processing for many different theaters or venues.

The integrated server 540 may have a similar structure as the integrated server 310 in FIG. 3 in that the integrated server 540 includes a synchronizer 542, a formatter 544, a web-server 546, and a wireless antenna 548. The integrated server 540 also receives and/or stores the media file 505. However, the integrated server 540 may not include a microphone. Instead, the integrated server 550 receives the audio sound track data from the client device 530 through the network 550. Also, the server may not have the wireless antenna 548 and may be connected to the network 550 through an Ethernet port, a USB port, or other wired network connection means. The exemplary embodiments include any connection means that connects the integrated server 540 with the client device 530 through a network.

The synchronizer 542 receives the synchrony track 202 of the media file 505 and the audio sound track from the client device 530 through the network 550 and synchronizes the media file 505 with the content file 508 using watermarking, SMPTE time codes, or fingerprinting. If the synchronizer 542 is part of an integrated server, the hinting track may be omitted since the integrated server 540 likely has enough processing power to perform the fine fingerprinting method. The synchronizer 542 may determine the time stamp of the content file 508 and begin playback of the media file 505 from the determined time stamp of the content file 508. Thus, the media file 505 plays in synchronization with the content file 508. The synchronizer 542 may also perform periodic updates to check if the media file 505 and the content file 508 remain in synchronization throughout the playback of the content file 508.

The formatter 544 receives the synchronized media file 505 from the synchronizer 542 and formats the tracks of the media file 505 for distribution to client device 530. The formatter 544 is configured to format the data included in the media file 505 for all types of client devices 530. For example, the formatter may format the data to be displayed on tablets differently than the data to be displayed on smart phones. The formatted data is sent to the web server 546.

The web server 546 receives the formatted and synchronized data of the media file 505 and outputs the formatted data to the client device 530 through an antenna 548. The wireless antenna 548 may provide the captions, video descriptions, etc. of the media file 505 through the network 550. As stated above, the synchronized and formatted data of the media file may be output through another network connection means, such as an Ethernet port. The web-server 546 may also be configured to manage a website.

The client devices 530 may receive the captions, video descriptions, etc. from the web server 316 through the application 534. Once the application 534 receives information from the web server 546, the client device 530 displays captions, outputs the audio narration, or outputs alternative languages, etc. In the website example, the client device 530 is able to receive the assistive technology through a web-page. Also in the website example, the software application 534 running on the client device 530 may be a web browser instead of a specialized application. The website example may be the easiest way for client device 530 to receive the assistive technology because no set up time is required other than navigating to the webpage.

In a wide area network server based method, a server performs the sound processing required to synchronize the media file and the content file 508. While the integrated server 540 is suited to perform high level processing, such as fingerprinting, the venue may still be required to install the integrated server 540. However, one server may be capable of performing sound processing for many different client devices 530. For example, the integrated server 540 may recognize that several client devices are requesting a media file for the same piece of content, and the integrated server 540 may group all these client devices together and only analyze the audio sound track sent from one of the client devices in the server created group. In this embodiment, one theater chain may be able to use one integrated server 540 for all theater locations across the country. Alternatively, the content provider may provide the integrated server 540 for all theaters. Either way, the cost to include the server may be spread out over multiple parties, thus lowering the investment cost for each individual venue.

Also, in the wide area network server based method, the client device 530 may not need to have the media file 505 downloaded onto the device itself. As a result, a patron desiring to benefit from the captions, video descriptions, or alternative languages of the media file 505 need only bring a computing device, such as a tablet or smart phone. No additional set up or downloading may required, except that the application 534 may first be downloaded, but this additional step only happens once, not every time a user consumes content. Also, applications are often much smaller in size than media files 505, so the application may be more quickly and easily downloaded through an application distribution store. Additionally, in the website example, a software application is not necessary because a web browser may be all that is required.

Because the wide area network server based method requires a network, there may be a delay because sending information over a wide area network takes more time than sending information over a local area network. To overcome the network delay issues, latency adjustment techniques may be included on the server side or the client side. For example, the integrated server 540 may begin playback of the media file 505 a predetermined period of time ahead of the audio that the integrated server 540 received through the network 550 to account for the network delay. The integrated server 540 may also be able to measure the network delay and account for the network delay accordingly.

Figure 6:
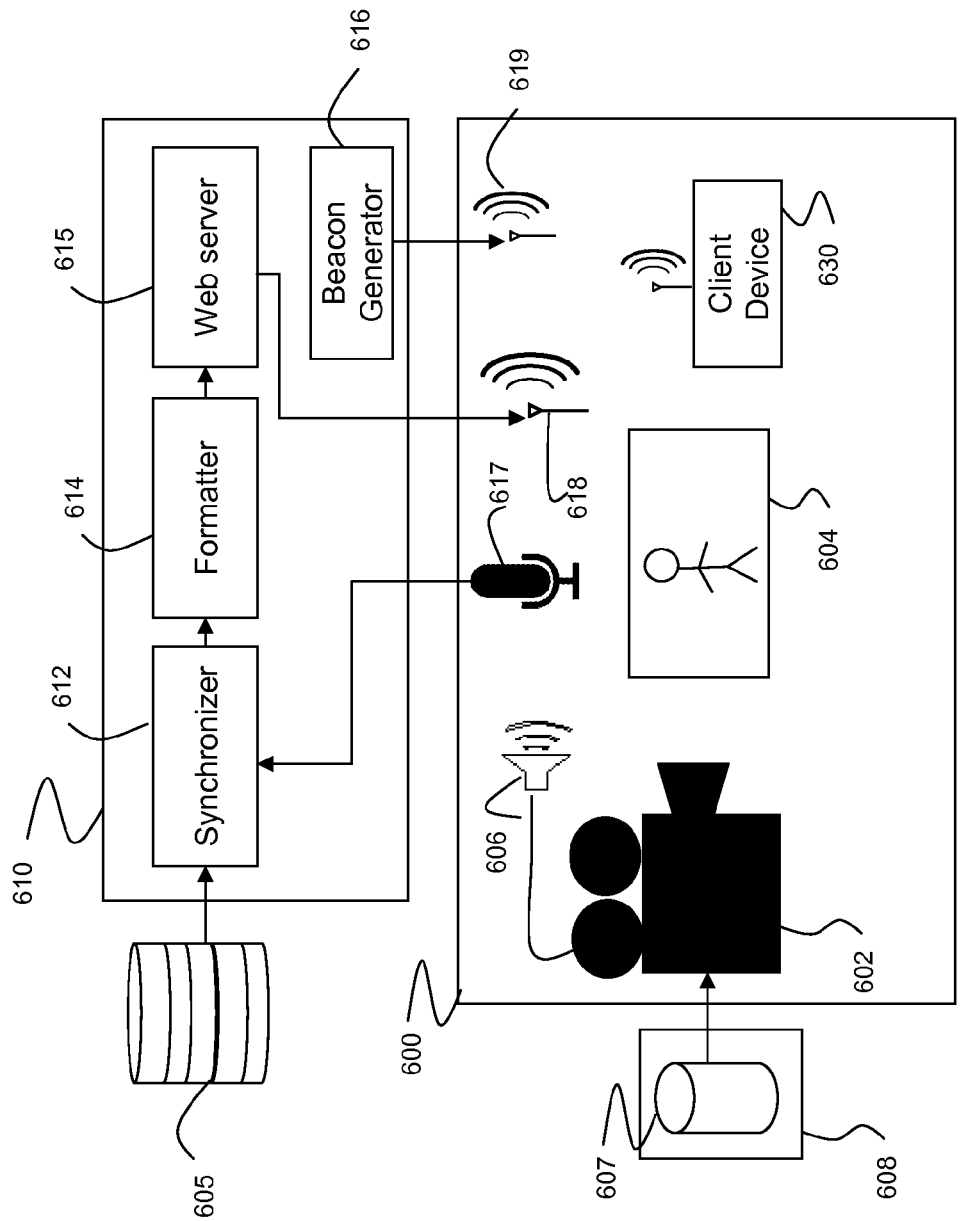
FIG. 6 illustrates a method of providing assistive technology including a security measure according to an exemplary embodiment.

FIG. 6 illustrates a server based method of providing assistive technology including a beacon security measure according to an exemplary embodiment. Although the system and method described with respect to FIG. 6 appear similar to the system and method described in FIG. 3, it is intended that the beacon security measure can be applied to other embodiments as well.

A movie theater 600 includes a projector 602, a screen 604, and speakers 606. A movie theater 600 is illustrated in this exemplary embodiment, but the exemplary method can easily be adapted to a home theater, an outdoor theater, or any other type of facility that presents content. The projector 602 displays content 607 provided from a content server 608 on the screen 604. The audio sound track of the content 607 is emitted through the speakers 606.

An integrated server 610 can be in a remote location from the theater 600. The integrated server 610 includes a synchronizer 612, a formatter 614, and a web-server 615. The integrated server 610 may be connected to a microphone 617 and an antenna 618, both of which may be located within the theater 600. The integrated server 610 receives or has in storage the media file 605. The microphone 617 picks up the audio sound track of the content 607 emitted from the speakers 606. The microphone 617 sends the picked up audio sound track of the content file 607 to the synchronizer 612 in the integrated server 610. The functions of the synchronizer 612, the formatter 614, and the web-server 615, the microphone 617, and the antenna 618 are explained in further detail above.

The client device 630 may receive the captions, video descriptions, or other data from the web server 615 through a web browser or a specialized software application. Once the web browser or software application receives information from the web server 615, the client device 630 displays captions, outputs the audio narration, or outputs alternative languages.

As a security measure, the integrated server 610 further includes a beacon generator 616. The beacon generator 616 is connected to an antenna 619. The antenna 619 may be a second antenna, or the beacon generator 616 may be connected to the antenna 618 that outputs the synchronized and formatted content from the media file to the client devices 630. For illustration purposes, the beacon generator 616 is connected to a separate antenna 619. The beacon generator 616 is configured to generate a beacon to be output by the antenna 619. The beacon is a security feature that prevents the client device 630 from having access to the media file outside of the range of the antenna 619, which is preferably the boundaries of the theater 600. The beacon may be included in the security files of the media file. The beacon generator 616 may periodically output the beacon, or the beacon generator 616 may be used as an authentication mechanism to prevent unauthorized access. For example, the theater 600 may charge an additional fee for using the assistive technology of the media file. If a user did not pay the additional fee, the beacon may prevent the client device 630 from accessing the assistive technology content of the media file.

The client device 630 must receive the beacon in order to receive the assistive technology content of the media file. This added security measure prevents the client device 630 from accessing the media file once the client device 630 is removed from the theater 600. As described above, the video description track and the captions can be very similar to a script, which has value to content providers. Thus, the added security measure of the beacon prevents unauthorized access outside of a limited range, such as the perimeter of the theater 600.

Figure 7:
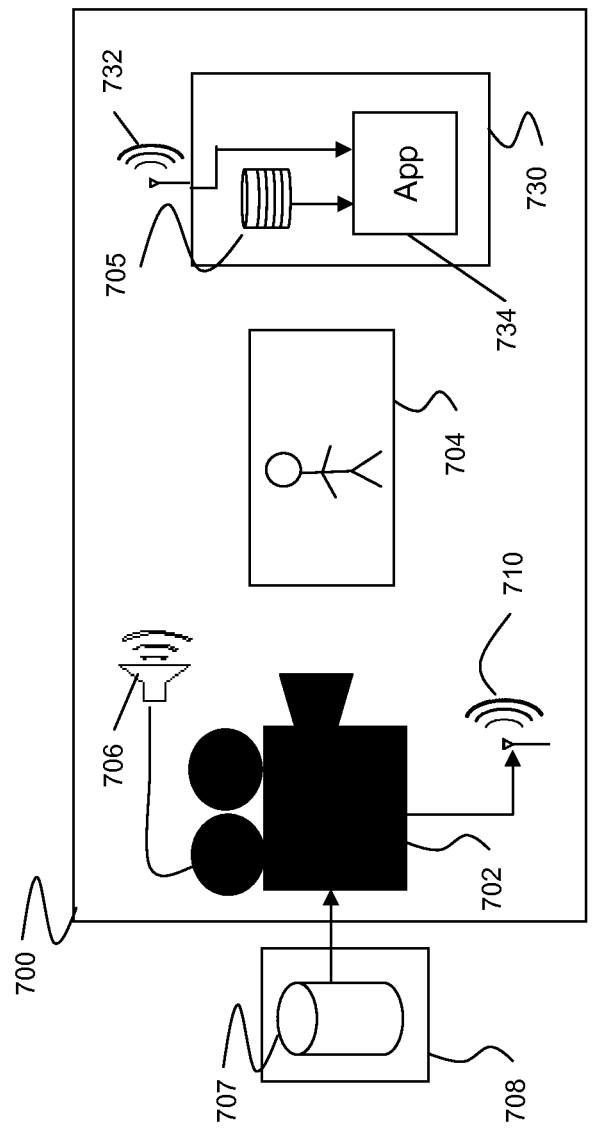
FIG. 7 illustrates a time-stamp based method of providing assistive technology according to an exemplary embodiment.

FIG. 7 illustrates time stamp reading method of providing assistive technology according to an exemplary embodiment. A movie theater 700 includes a projector 702, a screen 704, and speakers 706. A movie theater 700 is illustrated in this exemplary embodiment, but the exemplary method can easily be adapted to a home theater, an outdoor theater, or any other type of facility that presents content. The projector 702 displays content 707 provided from a content server 708 on the screen 704. The audio sound track of the content 707 is emitted through the speakers 706. The projector 702 includes a wireless antenna 710. The projector 702 is configured to read a time code, such as an SMPTE time code, from the content file 708 and output the time code through the wireless antenna 710. It should be noted that while the projector 702 is shown as displaying the content file 707 and outputting the time code, any content reading device may output the content file 707 and the time code as long as the content reading device has the ability to send time codes to other devices, and preferably wirelessly.

A personal device 730 is configured to receive the time code through the wireless antenna 732 included in the personal device 730. The time code received through the wireless antenna 732 is transferred to a software application 734. The application 734 also receives the media file. Once the time code is received from the projector 702, the media file 705 is synchronized with the time code. Upon synchronization, the software application 734 outputs the assistive technology included in the media file.

In this exemplary embodiment, no sound processing is performed because the projector 702 is able to read the time code directly from the content file 707. As a result, this configuration may require very little processing to synchronize the media file 705 and the content file 707. However, many content reading devices are not configured to output time codes wirelessly to personal devices.

In the exemplary embodiments discussed herein, the media file is included either on a client device or an integrated server. The media file may be distributed with the content as part of a content purchase. Additionally, the media file may be distributed through an online media store. The media file may be distributed for an additional fee or may be free with proof of purchase of the content file. For example, an admission ticket of a movie theater may include a voucher to download the media file from the online media store. For a home theater, a DVD's packaging may include a voucher to download the media file from the online media store. The media file may be distributed in different ways, and any distribution method is intended to be included in the scope of the exemplary embodiments.

By using the methods disclosed by the exemplary embodiments, the amount of investment to provide assistive technology may be significantly less than the conventional method of providing assistive technology in a venue, such as a movie theater. The personal devices used in the exemplary embodiments may be provided by the venue, but, because personal devices like tablets, smart phones, and laptops are commonly used and possessed by patrons, the venue may assume that patrons are able to bring their own personal devices to use the assistive technology. The investment cost is low because the methods of the exemplary embodiments rely on the content's sound track, which is provided in many pieces of content.

Also, the venue incurs no cost for providing equipment because patrons are able to provide the personal equipment themselves.

In addition, almost no installation may be required. The personal devices may need to install a piece of software such as an application, but the installation of such software requires minimal effort and time. If an integrated server is provided by the venue to synchronize content with the assistive technology, the venue may have more installation time. However, most venues have servers already included at the venue, and the set up time may be handled by an information technology specialist to prepare the server for the additional workload. Alternatively, the venue may be able to contract with a cloud computing provider to provide the necessary integrated server without buying and installing physical hardware on the premises of the venue.

Most importantly, the venue is able to offer assistive technology to patrons with hearing and vision impairment or to patrons who are not fluent in English. By offering the assistive technology, venues are able to offer their services to more patrons, and those with hearing and vision impairment are able to enjoy media and entertainment in additional venues.

The exemplary embodiments can include one or more computer programs that embody the functions described herein and illustrated in the appended flow charts. However, it should be apparent that there could be many different ways of implementing aspects of the exemplary embodiments in computer programming, and these aspects should not be construed as limited to one set of computer instructions. Further, those skilled in the art will appreciate that one or more acts described herein may be performed by hardware, software, or a combination thereof, as may be embodied in one or more computing systems.

The functionality described herein can be implemented by numerous modules or components that can perform one or multiple functions. Each module or component can be executed by a computer, such as a server, having a non-transitory computer-readable medium and processor. In one alternative, multiple computers may be necessary to implement the functionality of one module or component.

Unless specifically stated otherwise as apparent from the following discussion, it is appreciated that throughout the description, discussions utilizing terms such as "processing" or "computing" or "calculating" or "determining" or "displaying" or "generating" or "synchronizing" or "outputting" or the like, can refer to the action and processes of a data processing system, or similar electronic device, that manipulates and transforms data represented as physical (electronic) quantities within the system's registers and memories into other data similarly represented as physical quantities within the system's memories or registers or other such information storage, transmission or display devices.

The exemplary embodiments can relate to an apparatus for performing one or more of the functions described herein. This apparatus may be specially constructed for the required purposes, or it may comprise a general purpose computer selectively activated or reconfigured by a computer program stored in the computer. Such a computer program may be stored in a machine (e.g. computer) readable storage medium, such as, but is not limited to, any type of disk including floppy disks, optical disks, CD-ROMs and magnetic-optical disks, read only memories (ROMs), random access memories (RAMs) erasable programmable ROMs (EPROMs), electrically erasable programmable ROMs (EEPROMs), magnetic or optical cards, or any type of media suitable for storing electronic instructions, and each coupled to a bus.

The exemplary embodiments described herein are described as software executed on at least one server, though it is understood that embodiments can be configured in other ways and retain functionality. The embodiments can be implemented on known devices such as a personal computer, a special purpose computer, cellular telephone, personal digital assistant ("PDA"), a digital camera, a digital tablet, an electronic gaming system, a programmed microprocessor or microcontroller and peripheral integrated circuit element(s), and ASIC or other integrated circuit, a digital signal processor, a hard-wired electronic or logic circuit such as a discrete element circuit, a programmable logic device such as a PLD, PLA, FPGA, PAL, or the like. In general, any device capable of implementing the processes described herein can be used to implement the systems and techniques according to this invention.

It is to be appreciated that the various components of the technology can be located at distant portions of a distributed network and/or the Internet, or within a dedicated secure, unsecured and/or encrypted system. Thus, it should be appreciated that the components of the system can be combined into one or more devices or co-located on a particular node of a distributed network, such as a telecommunications network. As will be appreciated from the description, and for reasons of computational efficiency, the components of the system can be arranged at any location within a distributed network without affecting the operation of the system. Moreover, the components could be embedded in a dedicated machine.

Furthermore, it should be appreciated that the various links connecting the elements can be wired or wireless links, or any combination thereof, or any other known or later developed element(s) that is capable of supplying and/or communicating data to and from the connected elements. The term module as used herein can refer to any known or later developed hardware, software, firmware, or combination thereof that is capable of performing the functionality associated with that element. The terms determine, calculate and compute, and variations thereof, as used herein are used interchangeably and include any type of methodology, process, mathematical operation or technique.

The embodiments described above are intended to be exemplary. One skilled in the art recognizes that numerous alternative components and embodiments that may be substituted for the particular examples described herein and still fall within the scope of the invention.

What is claimed is:

1. A computer-implemented method for providing assistive technology, the method comprising:
   receiving, by a computing device, a time synchrony track of a media file and an assistive media component configured to assist a user with viewing or hearing a particular content file being screened at a venue, wherein the media file is associated with the content file;
   receiving, by a computing device, an audio portion of the content file using an audio receiving device;
   determining, by a computing device, a time code of the audio portion of the content file by performing sound processing on the received audio portion of the content file;
   synchronizing, by a computing device, the media file with the content file by matching the time synchrony track of the media file with the determined time code of the content file; and
   outputting, by a computing device, the assistive media component of the media file in synchronization with the content file.

2. The method of claim 1, wherein the audio receiving device is included in a client device and the audio portion of the content file is received from the client device over a network.

3. The method of claim 2, further comprising transmitting, by a computing device, the assistive media component of the media file in synchronization with the content file for receipt by the client computing device after synchronizing the media file with the content file.

4. The method of claim 2, wherein the network is a wide area network and the client computing device accesses the host computer by navigating to a webpage.

5. The method of claim 1, wherein a host computer is connected to a client device via a local area network, and the host computer provides the assistive media component to the client device through a wireless antenna that is located in the venue.

6. The method of claim 1, further comprising, generating, by a host computer, a security beacon to be wirelessly provided in the venue to a client device to authenticate the client device before transmitting the assistive media component of the media file to the client device.

7. The method of claim 6, wherein the client device is a smart phone, tablet, or laptop provided by a viewer consuming the content file.

8. The method of claim 7, wherein the host computer formats the assistive media component differently for a smart phone, a tablet, and a laptop.

9. The method of claim 1, wherein the sound processing is performed using audio watermarks.

10. The method of claim 1, wherein the sound processing is performed using a frame time code.

11. The method of claim 1, wherein the sound processing is performed using audio fingerprinting.

12. The method of claim 1, wherein the assistive media component comprises at least one file selected from the group consisting of an alternative language track, an assistive captioning component, a video description component, and an enhanced audio component.

13. A computer-implemented method for providing assistive technology, the method comprising:
  receiving, by a personal device, a time synchrony track of a media file and an assistive media component configured to assist a user with viewing or hearing a particular content file being screened at a venue, wherein the media file is associated with the content file;
  reading, by a content reading device, a time stamp from a digital time code included in metadata of the content file;
  transmitting, by the content reading device, the time stamp to the personal device;
  synchronizing, by the personal device, the media file with the content file by matching the time synchrony track of the media file with the received time stamp from the content reading device; and
  outputting, by the personal device, the assistive media component included in the media file in synchronization with the content file.

14. The method of claim 13, wherein the assistive media component comprises at least one file selected from the group consisting of an alternative language track, an assistive captioning component, a video description component, and an enhanced audio component.

15. An assistive technology system comprising:
  a host computer implementing a computer readable program code configured to:
  receive a time synchrony track of a media file and an assistive media component configured to assist a user with viewing or hearing a content file being screened at a venue, wherein the media file is associated with the content file;
  receive an audio portion of the content file;
  determine a time code of the audio portion of the content file by performing sound processing on the received audio portion of the content file;
  synchronize the media file with the content file by matching the time synchrony track of the media file with the determined time code of the content file; and
  transmit the assistive media component of the media file to a client device over a network.

16. The assistive technology system of claim 15, wherein the host computer receives the audio portion of the content file over the network from a client device configured to receive the audio portion of the content file through an audio receiving device.

17. The assistive technology system of claim 15, wherein the host computer is accessible to the client device over a wide area network by navigating to a webpage.

18. The assistive technology system of claim 15, wherein the host computer is further configured to generate a security beacon to be wirelessly provided in a venue to the client device to authenticate the client device before transmitting the assistive technology of the media file to the client device.

19. The assistive technology system of claim 15, wherein the assistive media component comprises at least one file selected from the group consisting of an alternative language track, an assistive captioning component, a video description component, and an enhanced audio component.

20. An assistive technology system comprising:
  a portable device implementing a computer readable program code configured to:
  receive a time synchrony track of a media file and an assistive media component configured to assist a user with viewing or hearing a particular content file being screened at a venue, wherein the media file is associated with the content file;
  receive an audio portion of the content file through an audio receiving device;
  determine a time code of the audio portion of the content file by performing the sound processing on the received audio portion of the content file;
  synchronize the media file with the content file by matching the time synchrony track of the media file with the determined time code of the content file; and
  output the assistive media component included in the media file in synchronization with the content file.

21. The assistive technology system of claim 20, wherein the sound processing includes coarse sound processing performed on a first period of audio of the received audio portion of the content file and fine sound processing performed on a shorter period of audio within the first period of audio.

22. The assistive technology system of claim 20, wherein the fine sound processing is performed using audio fingerprinting and the coarse sound processing is performed using audio hinting that searches for distinct sounds within the first period of audio of the received audio portion of the content file.

23. The assistive technology system of claim 20, wherein the assistive media component comprises at least one file selected from the group consisting of an alternative language track, an assistive captioning component, a video description component, and an enhanced audio component.

* * * * *